United States Patent [19]

Behrens

[11] Patent Number: 4,553,430

[45] Date of Patent: Nov. 19, 1985

[54] ILLUMINATED WIND SOCKS FOR AIRPORTS

[76] Inventor: Walter R. Behrens, Rte. 6, Country Club Rd., Minot, N. Dak. 58701

[21] Appl. No.: 626,522

[22] Filed: Jun. 29, 1984

[51] Int. Cl.⁴ ............................................. G01W 1/00
[52] U.S. Cl. ........................................ 73/188; 73/189
[58] Field of Search .................... 73/188, 189; 340/949

[56] References Cited

U.S. PATENT DOCUMENTS

| | | | |
|---|---|---|---|
| 1,359,406 | 11/1920 | McCarty | 73/188 |
| 1,742,574 | 1/1930 | Breedlove | 73/188 |
| 1,942,039 | 2/1934 | Tyler | 73/188 |
| 2,404,933 | 7/1946 | Strockstrom | 73/188 |
| 3,537,310 | 11/1970 | Barrett | 73/188 |
| 4,031,754 | 6/1977 | Bedard | 73/188 |
| 4,204,271 | 5/1980 | Braly | 73/188 |
| 4,227,406 | 10/1980 | Coffey | 73/188 |
| 4,402,220 | 9/1983 | Kuhlmann et al. | 73/188 |

Primary Examiner—Charles Frankfort
Assistant Examiner—David R. Schuter
Attorney, Agent, or Firm—Conrad A. Hansen

[57] ABSTRACT

An illuminated, vibration-resistant wind sock utilizes a light fixture mounted for rotation with the wind sock and having a spotlight bulb directed along the horizontal axis of the wind sock to provide even, continuous illumination of the wind sock interior and to produce a dramatic glowing effect to observers of the wind sock. The bulb may be mounted directly to a rotating axle coaxially with the supporting post or can be carried by radial arms attached to the circular framework of the wind sock.

8 Claims, 5 Drawing Figures

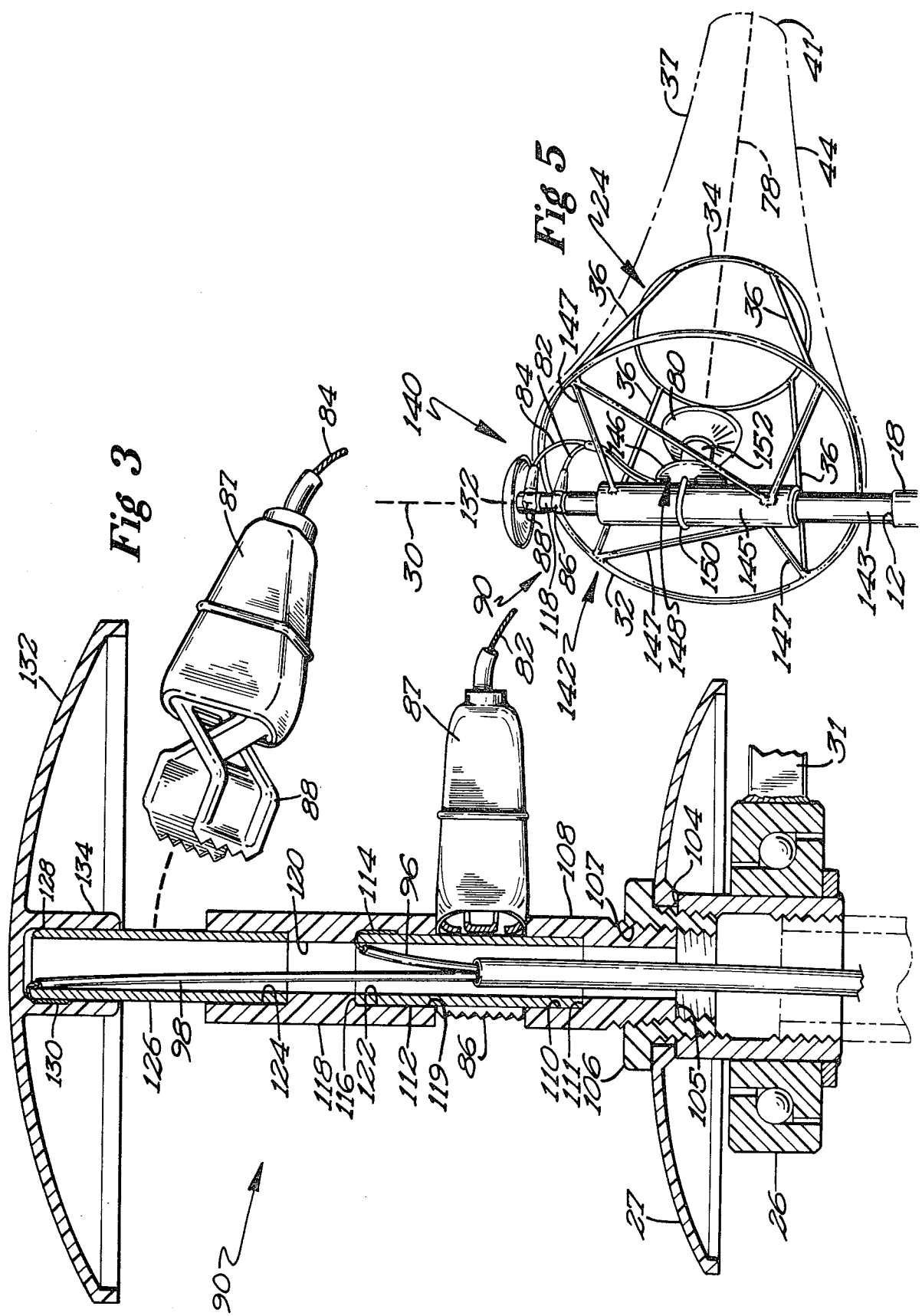

ILLUMINATED WIND SOCKS FOR AIRPORTS

BACKGROUND OF THE INVENTION

Various types of wind socks have been in use at airports around the world to indicate wind direction. Typically, these wind socks are mounted on an upright post and utilize a truncated, conical framework carrying a fabric which catches the wind and causes the framework to rotate about a vertical axis as the wind changes direction. Various wind sock and wind direction indicators are shown in U.S. Pat. Nos. 1,879,267, 2,404,933, 4,204,271, 3,537,310, 1,359,406, 1,942,039, 1,422,922, 1,742,574, and 1,776,111.

Since aircraft landings occur both in daylight and at night, it is essential that a wind sock indicator be well illuminated for nighttime visibility. Prior to the present invention, the illumination of commercially available wind socks has been accomplished by a system of stationary, incandescent bulbs positioned above the wind sock and rigidly carried by the supporting oost. Typically, the light system utilizes four light fixtures with a fixture attached to each of four radially, horizontally extending arms which are at right angles to one another and are connected to the top of the post. The light fixture on each arm has a light bulb which is aimed downward so that when the wind sock rotates into a position below the specific light, that light will illuminate the top of the wind sock. In effect, when the wind sock is in any given position, it is unusual for more than one or two of the lights to be substantially illuminating the wind sock and mostly, it is the upper half of the sock which is illuminated.

While the described lighting configuration provides an acceptable illumination system, the described system is exceptionally vulnerable to early bulb failure because the light fixtures, which are rigidly mounted to the post, undergo excessive vibration due to the constant changes in wind direction and gusting. Such vibration significantly shortens the life of bulb filaments and causes premature failures. Still another shortcoming is that the four bulbs needed for adequate illumination as the wind sock rotates about its axis, consume extensive electrical energy and only two, at most, are typically illuminating the sock. To the extent that fewer bulbs could be used, a significant saving in electricity is possible. Finally, while the four bulbs provide satisfactory illumination of the rotating wind sock, the fact that only one or two of the bulbs is illuminating the sock at any given time can result in uneven illumination of the sock, and it would be desirable to have a brighter, more evenly illuminated sock in order to observe the sock clearly at greater distances. As will be appreciated, should one or more of the bulbs fail, the wind sock may be still less effectively illuminated. For the above reasons, it is desirable to provide an improved wind sock which has more effective illumination, which requires less energy, and which has longer bulb life. The present invention provides an answer to these shortcomings.

SUMMARY OF THE INVENTION

The invention relates to the field of illuminated wind socks and comprises a vibration-resistant, long lasting illuminated wind sock which results in the wind sock being evenly illuminated by a single internal bulb and creates a dramatic glowing effect regardless of the direction from which the wind sock is viewed.

The improved wind sock utilizes a single light fixture mounted to the wind sock assembly for free rotation with the wind sock about a vertical axis. The device continually directs light into the interior of the wind sock to cause the transluscent material of the sock to glow brightly and dramatically in the night. By allowing the light fixture to rotate with the wind sock, the destructive vibration which has been a problem with prior art wind sock illumination systems is significantly diminished and bulb life prolonged. By placing the light fixture on the horizontal axis of the sock and utilizing a spotlight directed into the sock, it is possible to have the wind sock glowing uniformly and evenly throughout its length and achieving a significantly higher level of wind sock visibility.

A first embodiment of the invention has the light fixture carried by three radial arms which extend from a circular rim which supports the large end of the wind sock. The arms retain the light fixture on the horizontal axis of the wind sock and prevent the fabric of the wind sock from contacting the hot bulb.

A second embodiment utilizes a light fixture which is rigidly mounted to a rotating axle which is coaxial with the upright post. The light fixture rotates with the axle and the wind sock to continually, evenly direct its light deep within the wind sock.

A slip ring assembly is supported atop the wind sock assembly to receive and transmit electrical current from a power source to the rotating light fixture.

The invention is highly reliable, easily manufactured and inexpensive to install and maintain. It results in a significantly brighter wind sock with even lighting over the entire surface of the wind sock, and the device is easily installed in both new wind sock indicators and those now in use.

Other objects and advantages of the invention will become apparent from the following detailed description and from the appended drawings in which like numbers have been used to describe like parts of the several views.

BRIEF DESCRIPTION OF THE DRAWING

FIG. 3 is a cross sectional view of the slip ring assembly used with the invention.

FIG. 5 is a perspective view of a second embodiment of the invention shown in operating position on a supporting post.

DESCRIPTION OF THE PREFERRED EMBODIMENT

Figures 1, 2, 4:
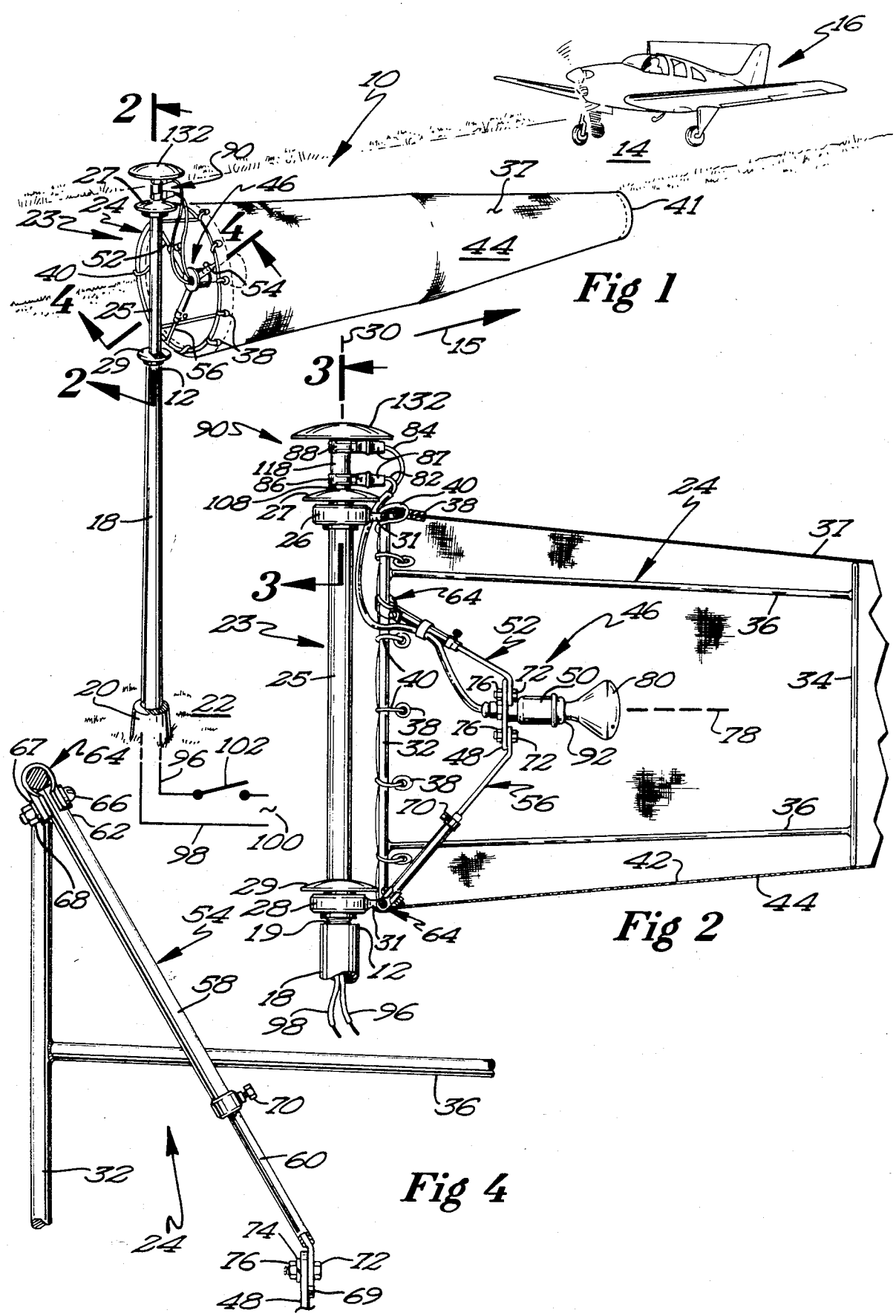
FIG. 1 is a perspective view of a vibration resistant, glowing wind sock embodying the invention and shown in use adjacent an airport runway.
FIG. 2 is a cross sectional side elevation view of the embodiment of FIG. 1 taken in the direction of cutting plane 2—2 of FIG. 1.
FIG. 4 is a cross sectional view of the mounting arrangement used for the light fixture of the wind sock of FIG. 1 and taken in the direction of cutting plane 4—4 of FIG. 1.

Referring now to FIG. 1, a first embodiment 10 of a vibration resistant wind indicator is shown in use adjacent airport runway 14 to indicate the wind direction 15 to an incoming aircraft 16.

The wind indicator 10 is attached to the upper end 12 of a generally upright rigid post 18 with a base 20 which is securely anchored to the earth 22.

The embodiment 10 is shown in FIGS. 1–4 and utilizes a wind sock assembly 23 which is securely attached to the upper end 12 of post 18 by screwing the lower threaded male end 19 of the assembly into an internal thread at upper end 12 of the post. The assembly 23 utilizes an upright axle 25 and includes upper and lower rotatable bearings 26 and 28, respectively, which are rotatably supported on the axle. Each of these bearings has a radially extending rod 31 which is welded to a rim 32 of wind sock framework 24 allowing the framework 24 to swing about axis 30 of post 18. Protective covers 27 and 29 overlie bearings 26 and 28, respectively, to shield the bearings from most precipitation.

The framework 24 comprises a generally truncated, conical, rigid cage having a large circular rim 32 and small circular rim 34 between which extends a plurality of straight supportive members 36. The wind sock 37 is formed of a generally soft, flexible fabric formed of either natural cloth or synthetic material and preferably has a conspicuous, highly visible coloration. The wind sock fabric 37 has inner and outer surfaces 42 and 44, respectively, and is transluscent so that internal light will pass outwardly through the fabric and produce an overall glow effect under the circumstances described hereafter.

The large end of the wind sock 37 is provided with a plurality of spaced grommets 38 which are lashed and secured to the large rim 32 by cord 40. As is well known to the art, the outer end 41 of the wind sock is allowed to hang downwardly where it extends beyond the framework 24 unless there is sufficient wind force to force it to an upright, outwardly extended position like that of FIG. 1.

Referring now to FIGS. 1, 2 and 4, a light fixture 46 includes a mounting plate 48, a light bulb socket 50 mounted to the plate 48 in any known manner, and radial, outwardly extending support arms 52, 54 and 56 which extend between the plate 48 and the circular rim 32. Because the arms 52, 54 and 56 are substantially identical, only the arm 54 will be described in detail. As best shown in FIG. 4, the arm 54 includes a rigid, hollow outer arm section 58 and an inner telescoping arm section 60 which moves in and out of the section 58. The outer end 62 of the arm is supplied with a mounting clamp 64 which engages the circular rim 32 and retains the outer end of the arm 54 to the rim. A screw 66 is passed through the clamp and section 58, and washer 67 and nut 68 securely retain the clamp and arm section to rim 32. An adjusting screw 70 permits the telescoping section 60 to be locked with any desired length extending from section 58. The inner end 69 of the arm 54 is attached to the mounting plate 48 by bolt 72 which is received through the plate 48 and section 60. A lock washer and nut, 74 and 76, respectively, are slipped onto the bolt 72 and the nut securely tightened.

The three arms 52, 54 and 56 cooperate to retain the light socket 50 on the central axis 78 of the wind sock and these arms collectively comprise a mounting means for retaining the light fixture to the wind sock assembly so that the light fixture can swing about axis 30 during rotation of the framework 24 but remain stationary relative to the framework 24.

A spotlight bulb 80 is operatively installed in the socket 50 over weather gasket 92 and is centered on the axis 78 of the wind sock. While other types of bulbs may be used in the socket, it has been found that a spotlight bulb 80 is best for providing a glowing effect to the wind sock material 37 and in delivering light to the most distant end 41 of the wind sock.

The socket 50 is energized through first and second electrical conductors 82 and 84 which extend from the socket and terminate in conventional alligator type electric clips 86 and 88, respectively, which are slidably attached to a slip ring assembly 90 which will be described further hereafter.

Referring again to FIG. 1, first and second electric power wires 96 and 98, respectively, are connected to electric power source 100 through an off-on switch 102 which is typically located in an airport control building. The power wires 96 and 98 extend upwardly through a hollow channel within post 18 and pass through the hollow central axle 25 of the wind sock assembly to emerge at the upper end 104 (FIG. 3) of the axle.

A slip ring assembly 90 is screwed into the adapter bushing 106 of upper end 104 of axle 25. The slip ring assembly 90 includes a first insulative member 108 which has its lower end 105 threaded into the internal threads 107 of bushing 106. The member 108 has an unthreaded vertically oriented bore 110 at its upper end, and the bore has an annular shoulder 111 which provides a stop for copper tube 112 described hereafter.

A rigid copper tube 112 is frictionally retained by bore 110 and bears against shoulder 111 to define a first annular conductive track which is in electric contact with clip 86 which grips the outer periphery of the copper tube 112 and slides about the tube as the wind sock assembly 23 swings about axis 30. The clip 86 is provided with an insulative shroud 87 which may have any suitable configuration to protect the clip and the track so as to avoid dirt or moisture contamination.

The end 114 of the first power wire 96 is bent over the upper end 116 of the tube 112 and is retained in permanent electrical contact against the copper tube 112 by frictional engagement between a second insulative member 118 and the tube 112. The member 118 has an internal bore 119 and an annular shoulder 120 with the bore tightly engaging the outer surface of the tube 112 to clamp the end 114 of the wire 96 between tube and bore. The shoulder 120 controls the depth of the bore which engages the tube 112. Accordingly, the insulative member 118 cooperates with the conducting tube 112 to define a first clamp which retains the power wire 96 therebetween to assure firm, reliable electrical contact between the wire and tube so that current may flow from the wire 96 to the clip 86 and thence along wire 82 to the socket 50.

The insulative member 118 is preferably formed of a polyvinylchloride material and includes a second circular bore 124 at the upper end with the shoulder 120 providing a stop against which copper tube 126 will rest. The upper bore 124 frictionally receives and engages the second copper tube 126, such tubing providing a second annular conducting track to which the electrical clip 88 is rotatably, slidably attached.

The second power wire 98 extends upwardly through the copper tubing 126 and has its end 130 folded over the upper end 128 of the tubing in electrical contact with the tubing.

An outwardly extending, generally circular umbrella-like weather cap 132 has a downwardly facing annular socket 134 which slips over and frictionally engages the upper end of the copper tubing and traps the end 130 of the second wire between the copper tubing 126 and the inside of the socket 134. Accordingly, the weather cap socket 134 and the tubing 126 cooperate to define a clamp which engages and retains the second power wire 98 to establish a reliable electrical connection by which current may flow from the power wire 98 to the copper tube 126 and annular conducting track 126 thereon.

While a specific alligator clip type arrangement has been shown for engaging the annular conducting tracks on tubes 112 and 126, it should be understood that other types of clips which will adequately rotate on the annular tracks are contemplated and are within the purview of the invention.

Accordingly, the insulative members 108 and 118, the conductive tubing 112 and 126 and the weather cap 132 collectively comprise a slip ring assembly usable with the invention to transfer electrical energy between the clips 86 and 88 and wires 96 and 98, respectively.

Referring now to FIG. 5, a second embodiment 140 of the invention is shown attached to the upper end 12 of a post 18.

The embodiment 140 utilizes an identical wind sock 37 but has a slightly different wind sock assembly and a different light fixture mounting arrangement. As shown in FIG. 5, the wind sock assembly 142 includes an upright axle 143 threaded into the upper end 12 of post 18 and supporting a rotatable housing 145 which rotates freely about the axle 143.

The housing 145 is attached to the outer rim 32 of the wind sock frame 24 by a plurality of rigid bars 147 which are welded to the housing 145 and to the rim 32.

The mounting plate 146 of light fixture 148 is secured to the housing 145 by a U bolt 150 which encircles the housing and is rigidly bolted to the plate 146. The light fixture 148 is positioned so that the bulb socket 152 and bulb 80 are positioned approximately on the horizontal central axis 78 of the wind sock 37 and preferably utilizes a spotlight bulb as described in conjunction with the embodiment 10. The first and second electrical conductors 82 and 84 which extend from the light fixture are substantially identical to those described in conjunction with the embodiment 10 and extend to a slip ring assembly 90 which is identical to that described in conjunction with the embodiment 10. A pair of electrical power wires extends upwardly through the hollow interior channel of the post 18 and enters a communicating hollow channel passing through axle 143 to join the copper tubes which form the slip ring assembly in an identical way to that described in FIG. 3.

In operation, the first embodiment 10 or the second embodiment 140 is installed at the upper end 12 of a post 18 adjacent an airport runway. With either of the disclosed embodiments, the wind sock is free to rotate about the vertical axis 30 in response to changes in wind direction. Directing attention to the embodiment 10, as the wind direction changes, the wind sock 37 swings freely with the upper and lower bearings 26 and 28 permitting alignment of the wind sock in the direction 15 of the wind. During such swinging movement, the light fixture 46 and its three outwardly extending arms 52, 54 and 56, moves with the framwork 24 of the wind sock but is stationary relative to the wind sock framework 24. As a result, the lamp 80 continually directs its beam along the axis 78 of the wind sock, resulting in a substantial direct, strong light beam being incident on the inner surface 42 of the wind sock. This direct lighting penetrates substantially to the end 41 of the wind sock and results in translucent material of the wind sock glowing dramatically in the darkness and causing it to be highly visible for a great distance around the airport.

Electrical power is supplied to the bulb 80 through electrical conductors 82 and 84. The conductors 82 and 84 receive electrical current through the electric clips 86 and 88, respectively, which engage the slip ring tracks created by the copper tubing 126 and 112. Current flows to the tubing 126 and 112 along electrical power wires 98 and 96, respectively, which have their ends tightly retained between the copper tubing and the adjacent insulative members. The electrical power wires 96 and 98 extend downwardly through the interior of the post 18 and are connected through a switch 102 to the power source 100.

As a result of the disclosed construction, the electric light fixture 46 and its bulb 80 rotate freely with the wind sock and thereby avoid much of the destructive vibration which has been applied to light bulbs which are rigidly fixed in place atop or within the wind sock but are not free to move in response to wind gusts. With the prior art placement of such stationary lighting, substantially all of the vibration generated by wind gusting and directional changes was passed to the bulb and had to be absorbed by the filament, resulting in greatly shortened bulb life. In addition, the shown configuration results in a wind sock which is far more brightly illuminated and highly dramatically visible than any previously used or known wind sock configuration.

Referring next to the operation of the second embodiment 140, it should be understood that the embodiment 140 utilizes a slightly different rotational mounting system for the wind sock by which an outer housing 145 is rotatably carried on an axle 143, permitting the wind sock to rotate with the housing 145 about the axle 143. The electric light fixture 148 is fixed to the outer surface of the housing 145 and rotates with the housing so as to direct its socket 152 and bulb 80 substantially along the horizontal central axis 78 of the wind sock during rotation of the wind sock 37. The electric power is supplied to the light fixture 143 by wires 82 and 84 which connect to a slip ring assembly whose operation is identical to that described in the embodiment 10.

While the illuminated wind sock configuration described herein has been shown as being used with two specific forms of rotational mounting for wind socks, it should be understood that the invention is usable with any rotationally mounted wind sock and can be used to supply a long lasting, vibration-resistant light source within the wind sock and which rotates with the wind sock to assure constant, even and dramatically bright glowing of the wind sock.

While the preferred embodiments of the present invention have been described, it is understood that various changes, adaptions and modifications may be made therein without departing from the spirit of the invention or the scope of the appended claims.

What is claimed is:

1. A vibration resistant, glowing wind indicator for indicating nighttime wind conditions and usable with a rigid upright post and with an electric power source with first and second energizable electric power wires comprising:

a wind sock assembly mountable to the post for swinging movement about a vertical axis in response to wind conditions, said wind sock assembly including a circular rim, a wind sock formed of translucent material carried on said rim, said wind sock having interior and exterior surfaces and a generally horizontal central axis coaxial with said circular rim;

a light fixture connectable to the power source and mounted on said wind sock assembly and spaced laterally outward from said vertical axis to rotate with said assembly about said vertical axis and being stationary relative to said swingable wind sock to thereby reduce destructive vibration of said light fixture, said fixture including a bulb socket and a plurality of arms extending outwardly from said bulb socket and each said arm having a remote end attached to said circular rim to retain said socket along said horizontal central axis of said wind sock and confronting said interior surface of said wind sock and first and second electrical conductors electrically connected with said sock and electrically connectable to said power source; and a light bulb operatively installed in said bulb socket and spaced laterally outward from said vertical axis to swing with said wind sock assembly thereby reducing destructive vibration of said bulb, said bulb confronting said interior surface of said wind sock to continually and uninterruptedly illuminate said interior surface during swinging of the assembly and cause said outer surface of said translucent material to glow in the night, making said glowing wind sock highly visible to observers.

2. A vibration resistant, glowing wind indicator for indicating nighttime wind conditions and usable with a rigid upright post and with an electric power source with first and second energizable electric power wires comprising:

a wind sock assembly mountable to the post for swinging movement about a vertical axis in response to wind conditions and including a wind sock formed of translucent material and having interior and exterior surfaces and a generally horizontal central axis;

a light fixture connectable to the power source and mounted on said wind sock assembly to rotate with said assembly about said vertical axis and being stationary relative to said swingable wind sock to thereby reduce destructive vibration of said light fixture, said fixture including a bulb socket confronting said interior surface of said wind sock and first and second electrical conductors electrically connected with said sock and electrically connectable to said power source;

a light bulb operatively installed in said bulb socket to swing with said wind sock assembly thereby reducing destructive vibration of said bulb, said bulb confronting said interior surface of said wind sock to continually and uninterruptedly illuminate said interior surface during swinging of the assembly and cause said outer surface of said translucent material to glow in the night, making said glowing wind sock highly visible to observers;

said wind sock assembly including:

an upright axle having upper and lower ends and having a hollow interior longitudinal channel within said axle and through which the first and second power wires extend upwardly from said post, said lower end of said axle being attachable to the post; and a slip ring assembly including first and second slip rings and carried by said axle, said first and second slip rings being electrically connectable to said first and second power wires, respectively, and electrically connected with said first and second electrical conductors, respectively, of said socket to continuously conduct electrically from said slip rings to said socket during swinging of said wind sock about said vertical axle; and said slip ring assembly further including:

a first insulative member carried by said upper end of said axle and rotatable with said axle;

a first annular conductive track retained within said first insulative member to define said first slip ring and electrically connectable to the first power wire; and a first clip slidably attached to said first annular conductive track for sliding movement along said first track as said track rotates with said axle, said clip being electrically connected to said first conductor of said socket.

3. The vibration resistant, glowing wind sock of claim 2 wherein said first insulative member and said first conductive track cooperate to define a first clamp capable of retaining the first power wire therebetween.

4. The vibration resistant, glowing wind sock of claim 2 wherein said slip ring assembly further includes:

a second insulative member carried by said first conductive track, rotatable with said axle and extending upwardly from said track;

a second annular conductive track carried by said second insulative member to define said second slip ring and electrically connectable to the second power wire, said track extending upwardly from said second member and having an upper end; and a second clip slidably attached to said annular conductive track for sliding movement along said second track as said track rotates with said axle, said second track being electrically connected to said second conductors of said socket.

5. The vibration resistant, glowing wind sock of claim 4 wherein said second insulative member and said track cooperate to define a second clamp capable of retaining the second power wire therebetween.

6. The vibration resistant, glowing wind sock of claim 4 and further including a protective weather-resistant cap carried by said upper end of said second track and extending radially outwardly of said tracks to overlie said first and second tracks and said first and second clips.

7. The vibration resistant, glowing wind sock of claim 6 wherein said bulb is a spotlight bulb and said light fixture is on the horizontal axis of said wind sock.

8. A vibration resistant, glowing wind indicator for indicating nighttime wind conditions and usable with a rigid upright post and with an electric power source with first and second energizable power wires comprising:

a rigid upright post;

a wind sock assembly carried by a rotatable housing mountable to the post for swinging movement about a vertical axis of said housing in response to wind conditions and including a wind sock formed of translucent material and having interior and exteriqr surfaces and a generally horizontal central axis;

a light fixture connectable to the power source and mounted on said rotatable housing within said wind sock assembly and including a bulb socket spaced laterally outward from said vertical axis to rotate with said rotatable housing within said assembly about said vertical axis and being stationary relative to said swingable wind sock to thereby reduce destructive vibration of said light fixture, said fixture including a mounting plate having a clamp thereon and carrying said bulb socket, said bulb socket positioned along said horizontal central axis of said wind sock and confronting said interior surface of said wind sock and said clamp gripping said housing and affixing said light fixture to said housing, said fixture further including first and second electrical conductors electrically connected with said socket and electrically connectable to said power source; and a light bulb operatively installed in said bulb socket and spaced laterally outward from said vertical axis to swing with said wind sock assembly thereby reducing destructive vibration of said bulb, said bulb confronting said interior surface of said wind sock to continually and uninterruptedly illuminate said interior surface during swinging of the assembly and cause said outer surface of said translucent material to glow in the night, making said glowing wind sock highly visible to observers.

* * * * *